United States Patent [19]

Seong et al.

[11] Patent Number: 5,773,938
[45] Date of Patent: Jun. 30, 1998

[54] APPARATUS FOR CONTROLLING SPEED OF A ROTARY MOTOR

[75] Inventors: Goan-soo Seong; Young-hun Kim; In-joong Ha, all of Seoul, Rep. of Korea

[73] Assignee: Samsung Electronics Co., Ltd., Kyungki-do, Rep. of Korea

[21] Appl. No.: 820,110

[22] Filed: Mar. 19, 1997

Related U.S. Application Data

[63] Continuation-in-part of Ser. No. 675,623, Jul. 3, 1996, Pat. No. 5,666,034.

[30] Foreign Application Priority Data

Jul. 4, 1995 [KR] Rep. of Korea ...................... 95-19515
Apr. 30, 1996 [KR] Rep. of Korea .................. 1996-14008

[51] Int. Cl.$^6$ ............................ B65H 59/38; G01B 15/43
[52] U.S. Cl. .............................. 318/6; 318/561; 318/609; 318/610; 360/73.08; 360/71; 242/334.2; 242/334.6
[58] Field of Search ........................ 318/6–16, 560–636, 318/779, 802; 388/800–809, 902; 360/73.08, 71, 73.04, 73.05, 77.13, 77.16, 73.01, 73.07, 73.09, 73.11, 73.12, 73.14, 74.2, 74.3, 74.4; 242/334.2, 334.6, 190, 189, 75; 364/149–170

[56] References Cited

U.S. PATENT DOCUMENTS

| 4,561,400 | 12/1985 | Hattori | 123/478 |
| 5,036,266 | 7/1991 | Burke | 318/646 |
| 5,155,422 | 10/1992 | Sidman et al. | 318/560 |

(List continued on next page.)

FOREIGN PATENT DOCUMENTS

| 469151 | 2/1992 | European Pat. Off. . |
| 61-122708 | 6/1986 | Japan . |
| 61-122720 | 6/1986 | Japan . |

(List continued on next page.)

OTHER PUBLICATIONS

Patent Abstracts of Japan, vol. 17, No. 646 (E–1467), Nov. 30, 1993 & JP–A–05 207776 (Toshiba Corp), Aug. 13, 1993.

Nobuyuki Matsui et al "Autocompensation of Torque Ripple of Direct Drive Motor by Torque Observer", pp. 187–194, IEEE Transaction on Industry Applications, vol. 29, No. 1, Jan. 1993, New York.

(List continued on next page.)

Primary Examiner—Paul Ip
Attorney, Agent, or Firm—Sughrue, Mion, Zinn, Macpeak & Seas, PLLC

[57] ABSTRACT

A speed control apparatus for a rotary motor includes a motor for rotating at a speed based on a torque command and which outputs a present angular position and a present angular speed of the motor. A speed measuring unit is provided for obtaining a speed error representing the difference between a reference angular speed and a present angular speed. A speed controller is provided for outputting a current command for controlling a rotational speed of the motor. A learning compensator is provided for correcting an effect of a disturbance expressed as a function of an angular position and an angular speed applied to the motor, via a repetitive learning process using the reference angular speed, any one of the speed error from the speed measuring unit and the current command output from the speed controller and the present angular position of the motor, for removing a high frequency noise generated in the repetitive learning process, and for outputting a resultant disturbance correction value. A speed command compensator is provided for obtaining a corrected current command by adding the current command value output from the speed controller and the disturbance correction value obtained in the learning compensator; and a current controller is provided for receiving the corrected current command and outputting a torque command to the motor. Thus, the apparatus stores in advance the correction value obtained in the learning compensator and effectively performs a speed control using the stored value.

21 Claims, 8 Drawing Sheets

U.S. PATENT DOCUMENTS

| | | | |
|---|---|---|---|
| 5,327,061 | 7/1994 | Gullapalli | 318/649 |
| 5,395,066 | 3/1995 | Yokoyama et al. | 242/334.2 |
| 5,481,417 | 1/1996 | Yokoyama et al. | 360/73.08 |
| 5,491,594 | 2/1996 | Yamamoto et al. | 360/73.04 |
| 5,610,487 | 3/1997 | Hutsell | 318/560 |
| 5,652,491 | 7/1997 | Ikawa et al. | 318/632 |
| 5,710,500 | 1/1998 | Matsuo et al. | 318/799 |

FOREIGN PATENT DOCUMENTS

| | | |
|---|---|---|
| 62-28803 | 2/1987 | Japan . |
| 332422 | 2/1991 | Japan . |
| 4208084 | 7/1992 | Japan . |
| 522974 | 1/1993 | Japan . |
| 527806 | 2/1993 | Japan . |
| 6102905 | 4/1994 | Japan . |
| 6149308 | 5/1994 | Japan . |
| 6324709 | 11/1994 | Japan . |

OTHER PUBLICATIONS

B.S. Stevens "The Compensation of Torque Variations In Electric Drives" European Power Electronics Chapter Symposium, Oct. 19–20, 1994, pp. 379–384.

M. Gotou et al. Development of Multirate Sampling Repetitive Learning Servo System and Its Application to a Compact Camcorder, Iros, 1991, Nov. 3–5, 1991, pp. 647–654.

APPARATUS FOR CONTROLLING SPEED OF A ROTARY MOTOR

CROSS REFERENCE TO RELATED APPLICATIONS

This application is a continuation-in-part of application Ser. No. 08/675,623, filed on Jul. 3, 1996, now U.S. Pat. No. 5,666,034, which is incorporated herein by reference.

BACKGROUND OF THE INVENTION

1. Field of the Invention

The present invention relates to a speed control of a rotary motor, and more particularly, to a speed control apparatus for a rotary motor contained in a video cassette recorder (VCR), in which a disturbance applied to the rotary motor is estimated and corrected to improve a speed control characteristic.

2. Description of the Related Art

When controlling the motor speed, factors which vary a control quantity are generated due to peripheral conditions. Such factors called disturbances render accurate speed control difficult. If control errors have been generated due to the disturbance, a VCR driven by a motor cannot perform accurately. Therefore, a good speed control characteristic can be obtained only when an effect of the disturbance is removed. Thus, such a disturbance is removed by estimating a torque of the disturbance of the motor by means of an observer. A control theory of suppressing such a load disturbance is being studied. One example is shown in FIG. 1.

FIG. 1 is a block diagram showing a conventional speed control apparatus of a rotary motor having a disturbance. The apparatus of FIG. 1 is disclosed in a paper entitled "Autocompensation of Torque Ripple of Direct Drive Motor by Torque Observer" by Nobuyuki Matsui, Tatsuo Makino, and Hirokazu Satoh (IEEE Trans. on Industry Applications, vol. 29, No. 1, January/February 1993, pp. 187–194). In FIG. 1, an adder A1 receives a reference angular speed $\omega^*_m$ according to a speed command and an angular speed $\omega_m$ fed back from a motor 15 and obtains a difference $\omega^*_m - \omega_m$. The difference $\omega^*_m - \omega_m$ is input to a speed controller 11. The speed controller 11 outputs a current command $i_v^*$ to control a rotational speed of the motor 15 according to the input difference $\omega^*_m - \omega_m$. The current command $i_v^*$ is input to an adder A2. The adder A2 adds the current command $i_v^*$ applied from the speed controller 11 and a disturbance removal command $i_L^*$ and obtains a corrected current command $i^*$. The disturbance removal command $i_L^*$ is obtained by multiplying an estimated disturbance load torque $\hat{\tau}_L(i)$ output from a torque observer 17 which receives an angular speed $\omega_m$ fed back from the motor 15 and an actual current $i$ by a transfer function $K_T^{-1}$. Here, values without the superscript * are actual values and values with the superscript * are command values.

Meanwhile, the corrected current command $i^*$ is input to a current controller 13. The current controller 13 expressed as the transfer function $K_T$ supplies a torque command $\tau^*$ to the motor 15 in order to control a rotational speed of the motor 15 in response to the corrected current command $i^*$. The motor 15 rotates at a speed corresponding to the torque command $\tau^*$ of the current controller 13.

The torque observer 17 which estimates an actual disturbance load torque $\tau_L$ applied to the motor 15, obtains an estimated disturbance load torque $\hat{\tau}_L(i)$ according to the following relationship (1) under the assumption that the disturbance is varied sufficiently slowly.

$$\hat{\tau}_L(i) = \epsilon(i) + L\,\dot{\omega}_m(i) \tag{1}$$

$$\epsilon(i+1) = \hat{A}\epsilon(i) + \hat{b}i_q(i) + \hat{K}\omega_m(i)$$

$$\hat{A} = 1 + LT_s/J_n$$

$$\hat{b} = -LK_{Tn}T_s/J$$

$$\hat{K} = L(L+D_n)T_s/J_n$$

Here, $J_n$, $D_n$ and $K_{Tn}$ are nominal values with respect to a moment of inertia J, a damping coefficient D and a torque constant $K_T$. L which is smaller than zero is an observer gain, $\epsilon$ is a virtual variable, $\hat{\tau}_L$ is an observer output, and $T_s$ is a sampling period.

The above relationship (1) can be combined to yield the following relationship (2).

$$\hat{\tau}_L(S) = \frac{1}{1+ST}\,\tau_L(S) \tag{2}$$

Here, $\tau_L$ is an actual disturbance load torque, $\hat{\tau}_L$ is an estimated disturbance load torque and S is a Laplacian operator. In this case, $T = -T_s/\ln(1+LT_s/J_n)$ and $1/1+ST$ serves as a low-pass filter. The values without a subscript n are actual values and values with the subscript n are nominal values which are designed to be close to the actual values. Thus, if the actual disturbance load torque $\tau_L$ is slowly varied, it approximates the estimated disturbance load torque $\hat{\tau}_L$ to completely remove the disturbance.

As described above, the conventional method of removing the disturbance by estimating the disturbance load torque of the motor requires a large calculation time due to the complex equations and thus, there are substantial problems associated with implementing it into hardware.

Also, a D-VCR technique which has been on the rise nowadays, requires a compact motor capable of being controlled at a constant speed and in a high precision state. Such a motor itself has a disturbance due to a cogging torque and bearing friction, and the disturbance of motor itself is involved with a high frequency. Since a bandwidth of the low-pass filter having the characteristic of 1/(1+ST) becomes large to follow up the fast varying disturbances, the observer gain L must be large accordingly. However, the observer gain cannot be enlarged without generating limitations in an actual implementation, and the disturbance is estimated with respect to time. As a result, a continuous estimation operation should be performed during the operation of a closed loop with respect to the speed control of the rotary motor. This requires a great deal of calculation and thus is difficult to implement known hardware. Also, such a disturbance of a motor itself having high frequency cannot be removed by only disturbance estimation and compensation with the conventional method.

SUMMARY OF THE INVENTION

To solve the above problem, it is an object of the present invention to provide a speed control apparatus for a rotary motor, which compensates an effect of a disturbance expressed as a function of an angular speed and an angular position via a learning function and removes a high frequency noise accumulated according to the increase of learning frequency.

To accomplish the above object in accordance with one aspect of the present invention, there is provided a speed control apparatus for a rotary motor, the speed control apparatus comprising:

a motor for rotating at a speed based on a torque command and which outputs a present angular position and a present angular speed of the motor; a speed measuring unit for obtaining a speed error representing a difference between an input reference angular speed and the present angular speed; a speed controller for receiving the speed error and outputting a current command for controlling a rotational speed of the motor; a learning compensator for correcting an effect of a disturbance expressed as a function of an angular position and an angular speed applied to the motor, via a repetitive learning process using the input reference angular speed, the present angular position of the motor, and one of the speed error from said speed measuring means and the current command output from said speed controller, for removing a high frequency noise generated by the repetitive learning process, and for outputting a resultant disturbance correction value; a speed command compensator for obtaining a corrected current command by adding a value of the current command output from the speed controller and the disturbance correction value obtained in the learning compensator; and a current controller for receiving the corrected current command and outputting a torque command to the motor.

Another object in accordance with another aspect of the present invention can be accomplished by providing a speed control apparatus for a rotary motor, the speed control apparatus comprising:

a motor for rotating at a speed based on a torque command, and generating a pulse signal and a frequency signal according to the rotation of the motor; a storage unit for storing disturbance correction values relevant to one rotation of the motor; a current controller for outputting the torque command based on an applied current command; and control means for generating a corrected current command corresponding to a present angular position of the motor, by using the pulse signal and the frequency signal of the motor and at least one of the disturbance correction values stored in the storage unit, and supplying the generated corrected current command to the current controller, wherein the control means is operative to:

(a) obtain the present angular position of the motor and a corresponding current command thereto using the pulse signal and the frequency signal of the motor;

(b) correct an effect of a disturbance expressed as a function of an angular position and an angular speed applied to the motor, via a repetitive learning process using a reference angular speed of the motor, the obtained present angular position and the corresponding current command, generate a disturbance correction value in which a high frequency noise generated in the repetitive learning process is removed, and store the generated disturbance correction value at a storage position corresponding to the present angular position in the storage unit; and (c) obtain a corrected current command applied to the current controller by adding a value of the obtained current command and the generated disturbance correction value.

BRIEF DESCRIPTION OF THE DRAWINGS

The preferred embodiments of the invention are described with reference to the accompanying drawings, wherein.

DETAILED DESCRIPTION OF THE PREFERRED EMBODIMENTS

Preferred embodiments of the present invention will be described below in more detail with reference to the accompanying drawings.

Figure 1:
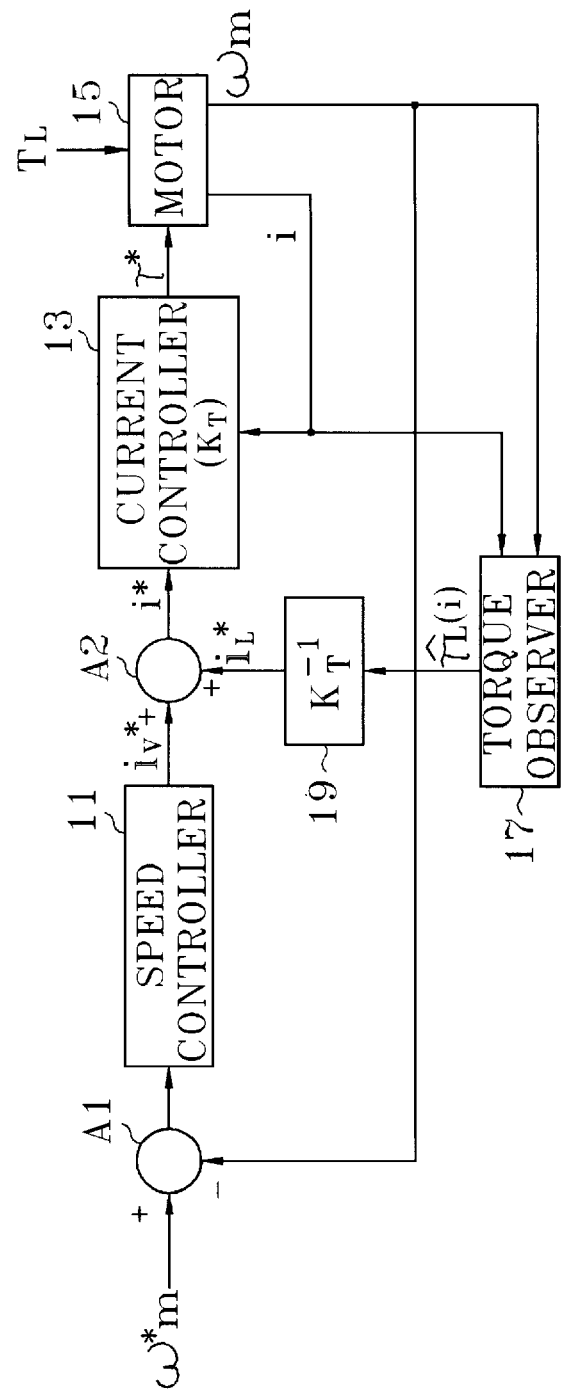
FIG. 1 is a block diagram of a conventional speed control apparatus for a rotary motor having a disturbance.
Figure 2:
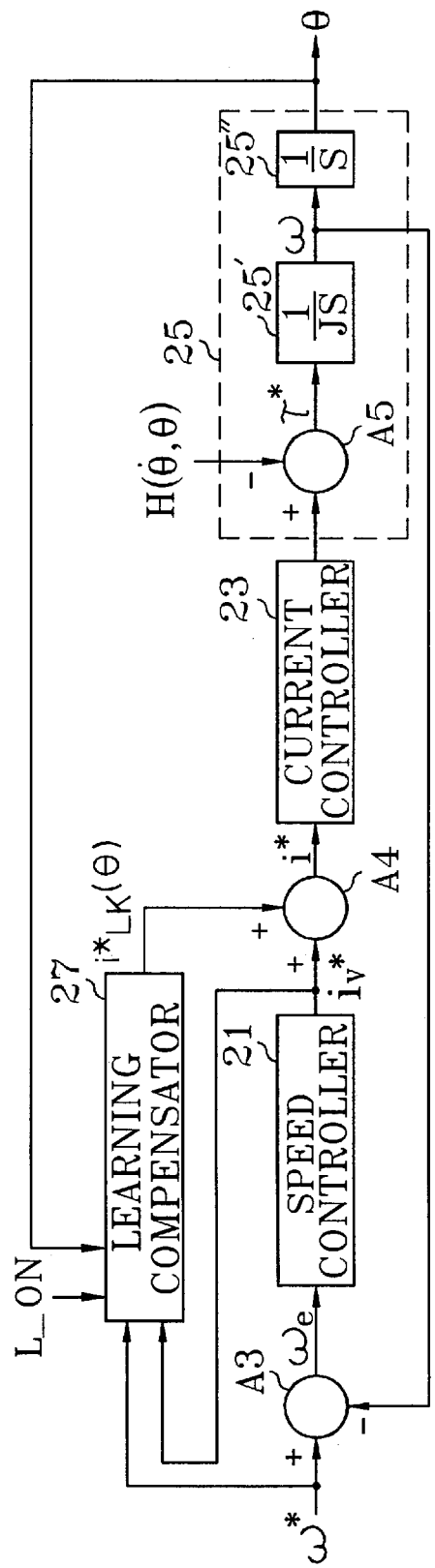
FIG. 2 is a block diagram of a speed control system for a rotary motor having a disturbance according to a preferred embodiment of the present invention.

A preferred embodiment of the present invention shown in FIG. 2 is similar to the conventional apparatus of FIG. 1. However, as shown in FIG. 2, a learning compensator 27 is used in the preferred embodiment instead of a torque observer 17. The learning compensator 27 receives a reference angular speed $\omega^*$ according to a speed command, the output $i_v^*$ of a speed controller 21 and an angular position $\theta$ fed back from a motor 25 to produce an output $i^*_{LK}(\theta)$ for correcting an effect of the disturbance.

Figure 3:
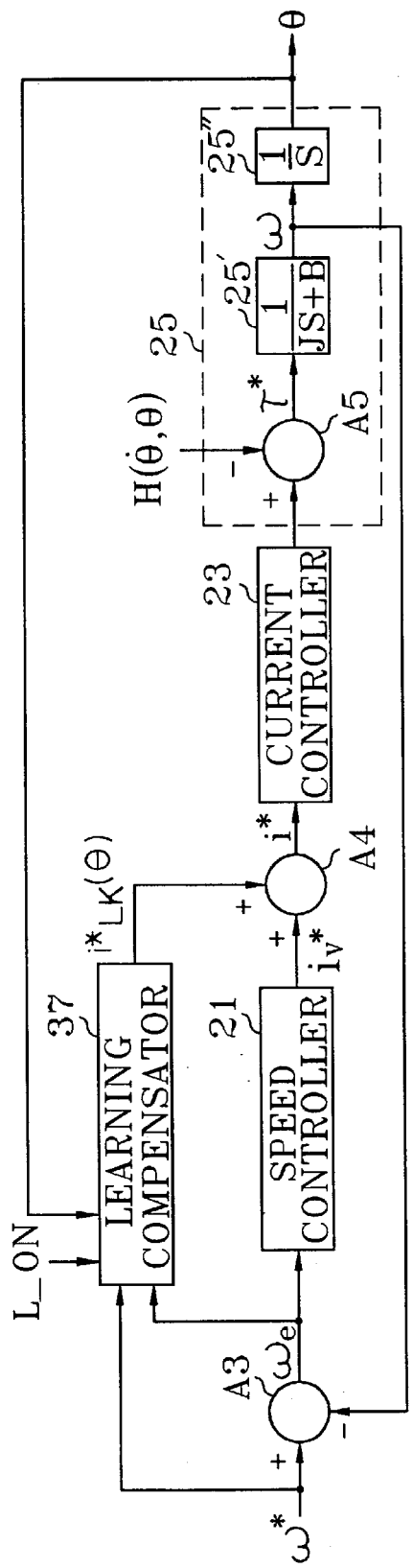
FIG. 3 is a block diagram of a speed control system for a rotary motor having a disturbance according to another embodiment of the present invention.

The system of FIG. 3 showing another embodiment of the present invention is similar to the FIG. 2 system. A learning compensator 37 receives a speed error $\omega_e$ output from a first adder A3 instead of a current command $i_v^*$ output from the speed controller 21, to produce the output $i^*_{LK}(\theta)$ for correcting an effect of the disturbance. In FIG. 2 and FIG. 3, the same reference numerals are used for the same elements.

If an external learning flag L_on is inputted after the motor 25 has been operated in a steady state, the system of FIG. 2 or FIG. 3 starts the disturbance removal operation of the motor 25 via repetitive learning. The present angular speed $\omega$ of the motor 25 is inputted to the first adder A3, and the present angular position $\theta$ is inputted to the learning compensator 27 or 37. The first adder A3 produces a speed error $\omega_e$ representing a difference between the present angular speed $\omega$ and a reference angular speed $\omega^*$. The speed controller 21 which receives the speed error $\omega_e$ output from the first adder A3 maintains the following relationship (3) between the torque and the angular speed $\omega$ of the motor 25.

$$J\frac{d\omega}{dt} + \tau_L = T = K_T i \qquad (3)$$

Here, J is the moment of inertia, $\omega$ is a present angular speed, $\tau_L$ is a load torque, T is an input torque and i is a current in the motor coil.

If a load torque is zero, the motor 25 has no load disturbance. Thus, an excellent speed control characteristic can be obtained using a general speed controller. If there is a load torque $\tau_L$, the speed control characteristic is lowered. In the embodiments of the present invention, the learning compensator 27 or 37 has been proposed in which an effect of the disturbance $H(\theta, \dot\theta)$ expressed as a function of an angular position $\theta$ and an angular velocity $\dot\theta$ is removed via a repetitive learning process.

In case of constant speed control, since $\theta$ equals $\omega^* t$, the output $i^*_{LK}(\theta)$ of the learning compensator 27 or 37 is a periodic function having a period T of $2\pi/\omega^*$ with respect to the speed command $\omega^*$ and the time, and is defined by the following relationship (4).

$$i_{LK}(\omega^*, \theta) = i_{L(K-1)}(\omega^*, \theta) + mZ_{(K-1)}(\theta) \qquad 4$$

Here, m is a repetitive learning gain and 0<m<1, and $Z_{(K-1)}$ is obtained by sampling the output of the speed controller 21 during a steady state for a period T.

Figure 4:
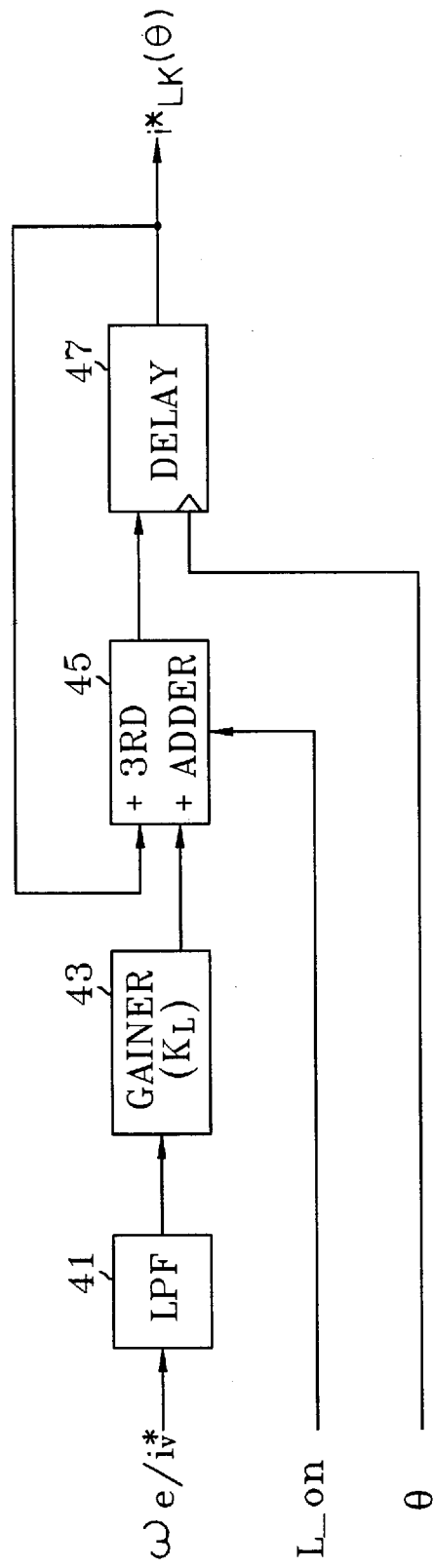
FIG. 4 is a detailed view showing a learning compensator.

In FIG. 4 showing the detailed block diagram of the learning compensator 27 or 37, the learning compensator includes a low pass filter 41 for removing a high frequency noise from the input current command $i_v^*$ or the speed error $\omega_e$, and a gainer 43 for multiplying the low-pass-filtered current command $i_v^*$ or the speed error $\omega_e$ by the learning compensation gain $K_L$. A third adder 45 connected to an output end of the gainer 43 adds a disturbance correction value prior to one rotation of the motor and the present output from gainer 43 to obtain a new disturbance correction value. A delay unit 47 connected to an output end of the third adder 45 delays the disturbance correction value obtained from the third adder 45 during the time as long as the motor rotates once, the delayed disturbance correction value is fed back to the third adder 45.

The operation of the learning compensator 27 or 37 will be described below in more detail with reference to FIG. 4. The low pass filter 41 low-pass-filters the received speed error $\omega_e$ or current command $i_v^*$. The low pass filter 41 removes a high frequency noise accumulated by the increase of learning frequency. As a result, the output of the learning compensator 27 or 37 converges into the disturbance component $H(\theta, \theta)$ being a function of the angular speed and the angular position, and thus the system is stabilized. An IIR (Infinite impulse response) filter is employed in the low pass filter 41. If the low pass filter 41 is located between the third adder 45 and the delay unit 47, a FIR (finite impulse response) filter can be used therein. A cut-off frequency of the low pass filter 41 is set just to suppress the disturbance due to a cogging torque of the motor 25. The output of the low pass-filter 41 is gain-controlled according to a gain value $K_L$ of the gainer 43. The gain value $K_L$ is changed according to an input value of the low pass filter 41. That is, in the case that the gainer 43 receives the speed error $\omega_e$, the gain value $K_L$ should be less than a proportional gain $K_P$ of the speed controller 21 ($0<K_L<K_P$), while the gainer 43 receives the current command $i_v^*$, the gain value $K_L$ should be less than "1" ($0<K_L<1$). The speed error $\omega_e$ or the current command $i_v^*$ gain-controlled via the gainer 43 is input to the third adder 45. The third adder 45 adds the outputs of the delay unit 47 and the gainer 43, while the external learning flag L_on is being enabled. Here, the output of the delay unit 47 is a disturbance correction value prior to one rotation of the motor. The new disturbance correction value output from the third adder 45 is supplied to the delay unit 47. The delay unit 47 uses the present angular position $\theta$ of the motor 25 received through a clock end, as an address n with regard to the disturbance correction value applied from the third adder 45 to thereby store the disturbance correction value. The stored disturbance correction value is delayed for the time $D^{-2\pi}$ as long as the motor 25 rotates once, and then outputted.

The learning compensator shown in FIG. 4 is represented by the following relationship (5) regardless of whether an input is the speed error $\omega_e$ or the current command $i_v^*$.

$$i_{L(K+1)}^*(n\cdot\Delta\theta)=i_{LK}^*(n\cdot\Delta\theta)+K_L\cdot LPF(i_v^*(n\cdot\Delta\theta)) \quad (5)$$

If the low pass filter 41 is located between the third adder 45 and the delay unit 47, the learning compensator is denoted by the following relationship (6).

$$i_{L(K+1)}^*(n\cdot\Delta\theta)=LPF(i_{LK}^*(n\cdot\Delta\theta)+K_L(i_v^*(n\cdot\Delta\theta))) \quad (6)$$

The relationship (6) is also adopted regardless of whether an input is the speed error $\omega_e$ or the current command $i_v^*$. In the relationships (5) and (6), $n\cdot\Delta\theta$ is an address with regard to the delay unit 47.

Returning to FIG. 2 and FIG. 3, the disturbance correction value $i^*_{LK}(\theta)$ obtained in the learning compensator 27 is inputted to the second adder A4 which adds the current command $i_v^*$ applied from the current controller 21 and the disturbance correction value $i^*_{LK}(\theta)$ applied from the learning compensator 27 to obtain a corrected current command $i^*$, and the corrected current command $i^*$ is inputted to the current controller 23. The current controller 23 outputs a torque command corresponding to the input corrected current command $i^*$. The fourth adder A5 of the motor 25 subtracts the disturbance component $H(\theta, \theta)$ from the torque command applied from the current controller 23, and outputs the resultant corrected torque command $\tau^*$. A speed of a rotating unit 25' which is represented as a transfer function 1/JS (see FIG. 2) or 1/(JS+B) (see FIG. 3), is controlled according to the torque command $\tau^*$. As a result of speed control, the present angular speed $\omega$ output from the rotating unit 25' is again fed back into the first adder A3 which uses the present angular speed $\omega$ for calculating an speed error $\omega_e$ with respect to the reference angular speed $\omega^*$. In case of FIG. 2, the speed error $\omega_e$ is inputted to the speed controller 21, and in the case of FIG. 3, the speed error $\omega_e$ is inputted to the learning compensator 37. The speed controller 21 outputs the current command $i_v^*$ for controlling a rotational speed of the motor 25 according to the input speed error $\omega_e$ to the second adder A4. In FIG. 2, the current command $i_v^*$ is again inputted to the learning compensator 27. The present angular speed is output as an angular position $\theta$ by means of an encoder 25" expressed as a transfer function 1/S and is fed back into the learning compensator 27.

Meanwhile, after the learning flag L_on is disabled, the learning compensator 37 receives the speed error $\omega_e$ output from the first adder A3 as an address, and outputs a disturbance correction value stored in a storage position of the delay unit 47 indicated by the address. An effective speed control can be implemented since the speed control after completion of the learning compensation is performed with only the output $i_v^*$ of the speed controller 21 being added to the disturbance correction value $i^*_{LK}(\theta)$ output from the learning compensator 27 (or 37).

As a result of simulation with respect to the systems of FIG. 2 and FIG. 3, the disturbance $H(\theta, \theta)$ is removed by the output $i^*_{LK}(\theta)$ of the learning compensator 27 via a few iterations of the repetitive learning process.

Figure 5:
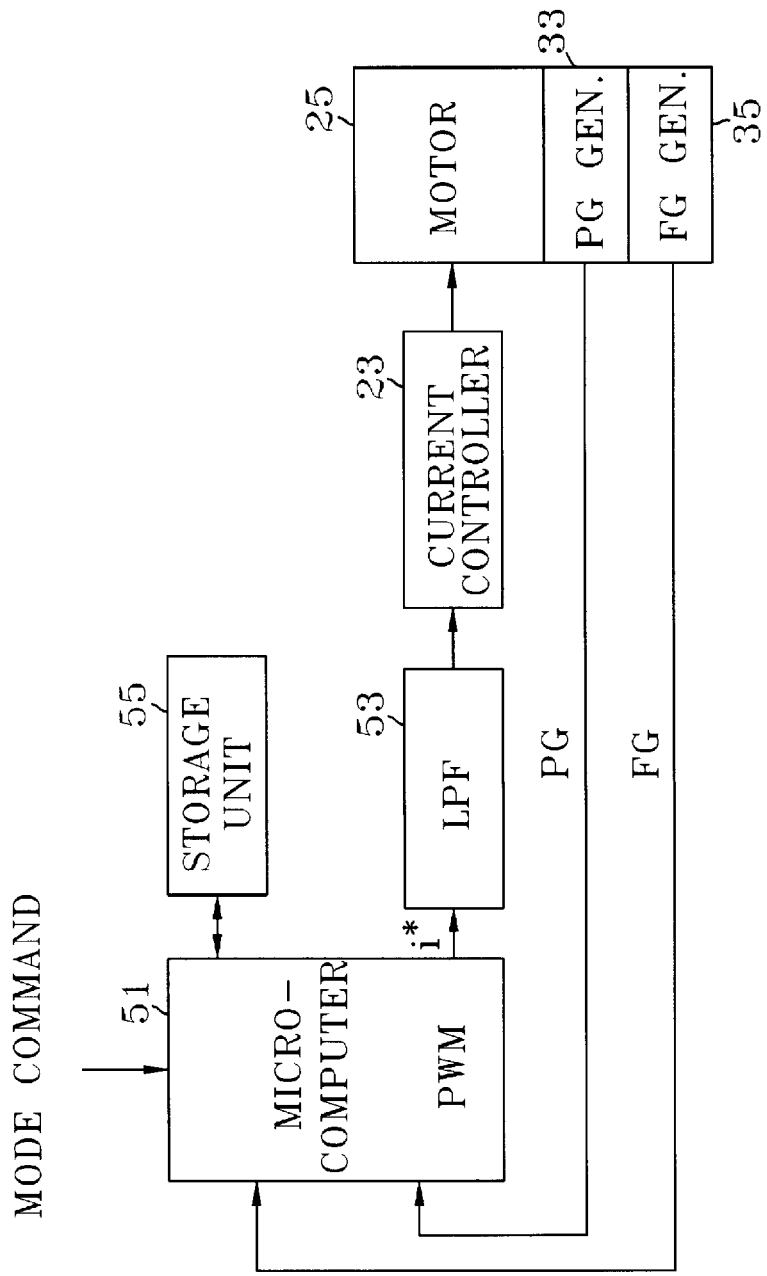
FIG. 5 is a view showing that the systems of FIG. 2 and FIG. 3 are incorporated into hardware.

FIG. 5 is an example showing that the speed control system for the rotary motor shown in FIG. 2 or FIG. 3 is incorporated into hardware. A microcomputer 51 of FIG. 5 receives a pulse signal PG and a frequency signal FG generated according to rotation of the motor 25 and a mode command concerning repetitive learning, and performs disturbance estimation and compensation via the repetitive learning. The microcomputer 51 uses the pulse signal PG and the frequency signal FG generated according to rotation of the motor 25 to obtain the present angular speed $\omega$ and the angular position $\theta$ of the motor 25. A storage unit 55 connected to the microcomputer 51 stores current commands and disturbance correction values obtained via repetitive learning with regard to one rotation of the motor 25. The storage unit 55 uses a store media, such as EEPROM, PROM or flash memory, wherein the EEPROM is preferably employed. A current command $i^*$ output from the microcomputer 51 in the form of PWM (pulse width modulation) is smoothed via a low pass filter 53 and then inputted to a current controller 23. In the case that the current command $i^*$ output from the microcomputer 51 is digital-to-analog converted, the current command is directly inputted to the current controller 23. The current controller 23 controls the rotational speed of the motor 25 according to the output of the low pass filter 53. The microcomputer 51 performs the functions of the first and second adders A3 and A4, the speed controller 21 and the learning compensator 27 or 37 with a program.

Figure 6:
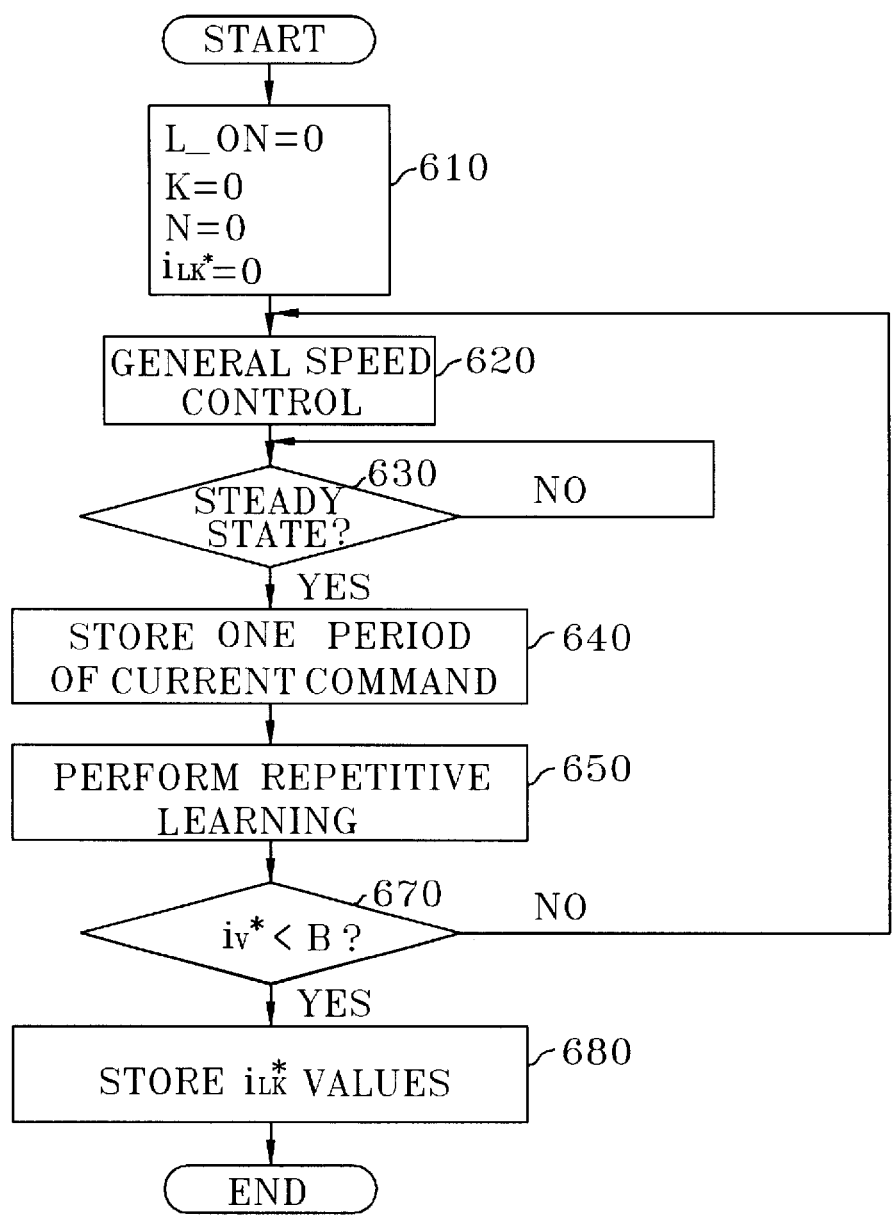
FIG. 6 is a flowchart diagram for explaining the operation of the FIG. 5 apparatus.
Figure 7A:
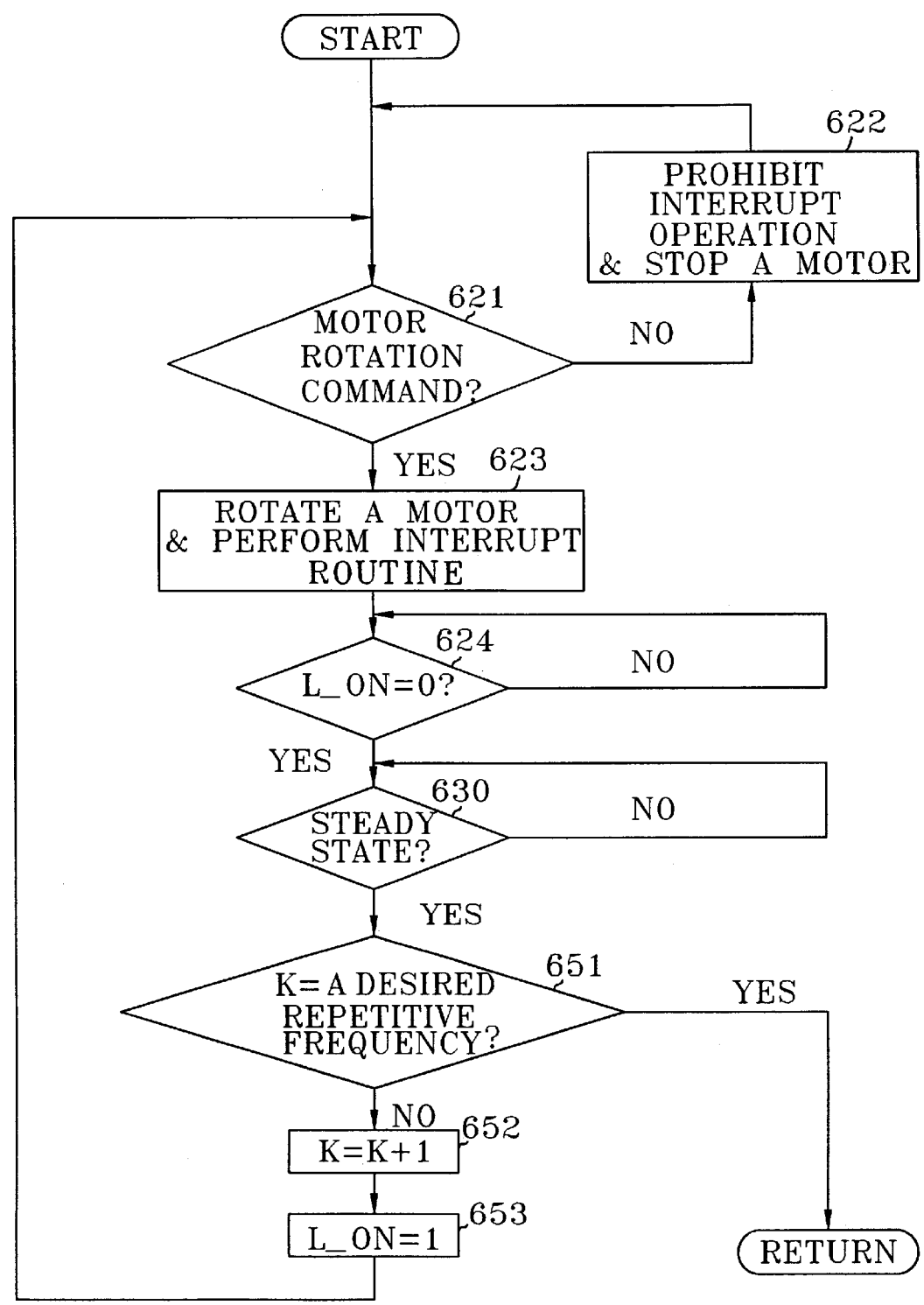
FIGS. 7A and 7B are detailed flowchart diagrams associated with FIG. 6.

FIG. 6 is a flowchart diagram for explaining the operation of the microcomputer 51 relating to the repetitive learning process. FIG. 7A is a flowchart showing a main routine for executing a repetitive learning operation during predetermined times, and FIG. 7B is a flow chart showing an interrupt routine to obtain the optimum disturbance correction values.

Referring to FIG. 6, when the operation starts, the microcomputer 51 initializes the learning flag L_on and the number K of the repetitive learning, the address pointer n of a distance correction value corresponding to the present angular position θ, and the disturbance correction values $i_{LK}^*$ into zeros (step 610). Then, general motor speed control for rotating the motor at a the speed to be desired is performed in step 620. If it is determined that the motor rotates in a steady state in step 630, the microcomputer 51 stores current commands $i_v^*$ during one period of rotation of the motor in step 640, and performs the main routine for repetitive learning shown in FIG. 7A in step 650.

Referring to FIG. 7A, the microcomputer 51 checks whether a motor rotation command is applied from the external in step 621. When the motor rotation command is not inputted, the microcomputer 51 prohibits an interrupt routine and stops the rotation of the motor 25 in step 622, and then performs the same operation as the initialization step 610. When the motor rotation command is applied from the external in step 621, the microcomputer 51 rotates the motor 25 according to the speed command being inputted together with the motor rotation command, and performs the interrupt routine in step 623.

Figure 7B:
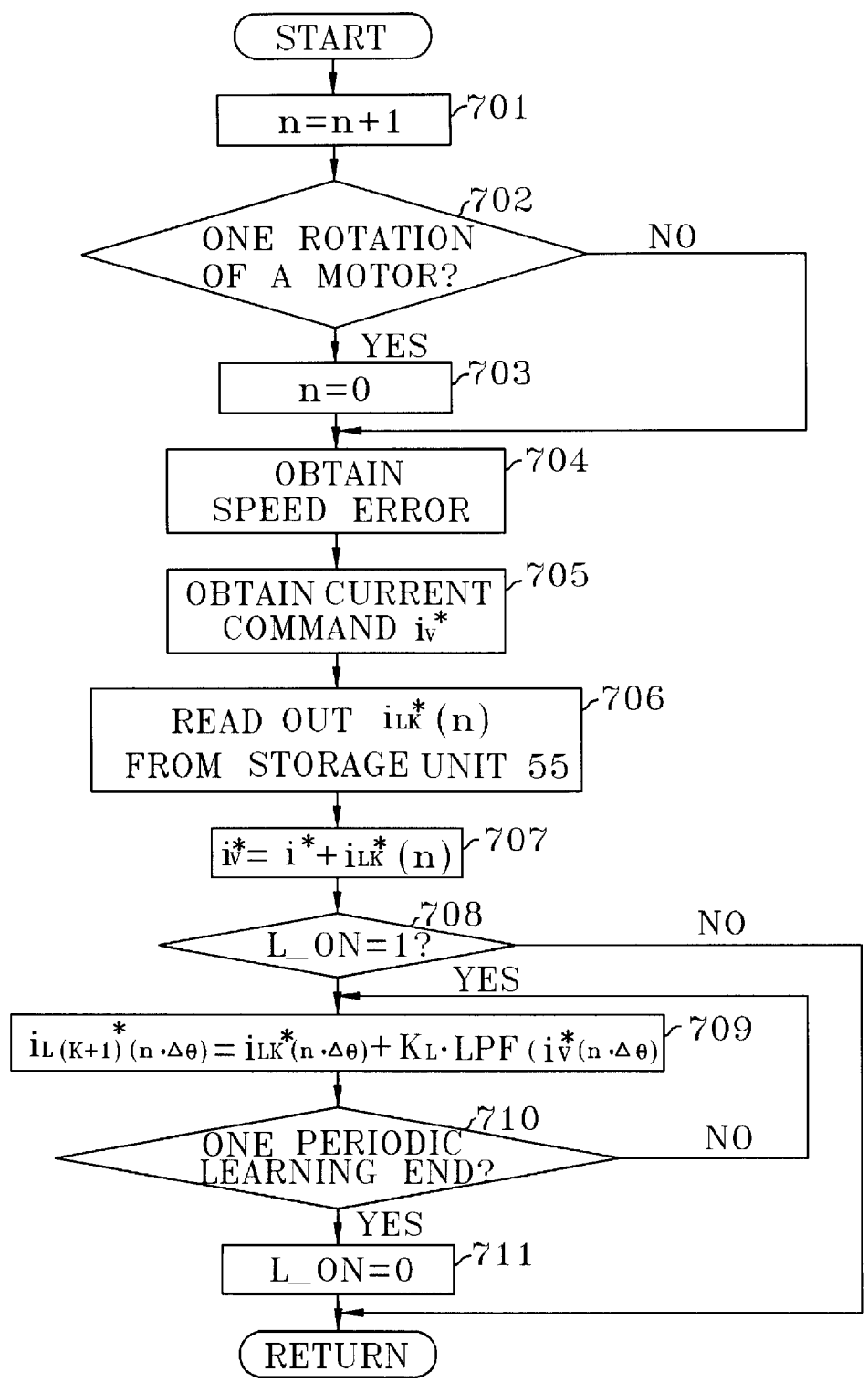

Referring to FIG. 7B showing in detail the interrupt routine of step 623, the microcomputer 51 increases the value of an address n (n=θ, 0<θ≦2π) by "1" whenever the frequency signal FG generated owing to the rotation of the motor 25 is inputted in step 701. Here, the frequency signal FG is generated by a FG generator 35 (see FIG. 5) used for detecting the rotation of the motor 25. The microcomputer 51 checks whether the motor 25 rotates once using the value of the address n in step 702. If the motor 25 rotates once, the microcomputer 51 again initializes the value of the address to '0' in step 703. In step 704, the microcomputer 51 obtains a present angular speed ω using the frequency signal FG of the FG generator 35, and calculate a speed error using the obtained present angular speed ω and the reference angular speed ω* according to the rotational command. Then, the current command $i_v^*$ corresponding to the calculated speed error in step 705 is calculated. The microcomputer 51 reads the corresponding disturbance correction value $i_{LK}^*(n)$ from the storage unit 55 using the value of address corresponding to the present angular position θ of the motor in step 706, and adds the obtained current command $i_v^*$ and the disturbance correction value $i_{LK}^*(n)$ to obtain a corrected current command i* in step 707. The corrected current command i* output from the microcomputer 51 is applied to the motor 25 through the low pass filter 53 and the current controller 23.

Meanwhile, the microcomputer 51 checks whether the learning flag L_on is '1' in step 708. If it is not '1', the interrupt routine stops and returns to the step 624 of FIG. 7A. In contrast, if it is '1' in step 708, the microcomputer 51 performs the step 709 of obtaining disturbance correction value $i_{L(K+1)}^*(n)$ using the above relationship (5). That is, the microcomputer 51 executes the low-pass-filtering and multiplication of the gain $K_L$ with respect to the current command $i_v^*$ corresponding to the value of the address, and then obtains a new disturbance correction value by adding the disturbance correction value read out from the storage unit 55. In step 709, the relationship (6) can be used instead of the relationship (5). In this case, the disturbance correction value read out from the storage unit 55 instead of a current command is low-pass-filtered. The microcomputer 51 stores the new disturbance correction value $i_{L(K+1)}^*(n)$ at the store position of the storage unit 55. Such learning operation is performed with respect to all the disturbance correction values stored in the storage unit 55. The microcomputer 51 checks whether the learning for one rotation of the motor, i.e., one period, is finished in step 710. If it is not finished, the microcomputer 51 performs the operation of step 709 repeatedly. On the other hand, if it is finished, the microcomputer 51 initializes the learning flag L_on to '0' in step 711 and terminates the interrupt routine, and then returns to the step 624 of FIG. 7A.

Meanwhile, the microcomputer 51 performs the step 624 for checking whether the learning flag L_on is '0' execution of the interrupt routine of FIG. 7B. If the learning flag L_on is '0', it means that the learning for one periodic rotation of the motor is accomplished. Therefore, if the learning flag L_on is not '0', the microcomputer 51 waits until the interrupt routine is finished. If the learning flag L_on is '0', it is checked whether the speed of the motor 25 is in a steady state in step 630. If it is in a steady state, the microcomputer 51 checks whether the number K of learning reaches the desired repetition frequency in step 651. Until it is reaches the desired repetition frequency, the microcomputer 51 increases a number K of learning by one in step 652 and sets the learning flag L_on to '1' in step 653, and then returns to step 621.

In step 651, when the number of learning K reaches the desired repetition frequency, the microcomputer 51 finishes the main routine of FIG. 7A and returns to step 670 of FIG. 6. In step 670, the microcomputer 51 uses the present angular speed ω of the motor and the reference angular speed ω* according to the rotational command to determine whether the obtained current command $i_v^*$ is smaller than a predetermined threshold B. What the obtained current command $i_v^*$ being smaller than a predetermined threshold B means is that the disturbance to be loaded on the motor 25 is compensated sufficiently. If the current command $i_v^*$ is larger than or equal to the predetermined threshold B, the microcomputer 51 returns to step 620 and performs the learning operation again. If the current command $i_v^*$ is smaller than the threshold B in step 670, the microcomputer 51 judges whether the disturbance is compensated sufficiently and then stores the disturbance correction values $i_{LK}^*$ in the storage unit 55 in step 680. Hereafter, the microcomputer 51 performs the disturbance removal using the disturbance correction values $i_{LK}^*$ stored in the storage unit 55.

As described above, the speed control apparatus for a rotary motor according to the present invention determines and stores the disturbance correction values for compensating an effect of the disturbance via a repetitive learning process, and performs the speed control using the stored disturbance correction values, to thereby provide an advantage that simple and efficient speed control can be performed. Also, the speed control of the motor is stabilized regardless of the frequency of repetition of learning since a high frequency noise generated by the repetitive learning process is removed by means of the low pass filtering.

While only certain embodiments of the invention have been specifically described herein, it will be apparent that numerous modifications may be made thereto without departing from the spirit and scope of the invention.

What is claimed is:

1. A speed control apparatus for a rotary motor, comprising:
   a motor for rotating at a speed based on a torque command and which outputs a present angular position and a present angular speed of the motor;
   speed measuring means for obtaining a speed error representing a difference between an input reference angular speed and the present angular speed;
   a speed controller for receiving said speed error and outputting a current command for controlling a rotational speed of the motor;
   a learning compensator for correcting an effect of a disturbance expressed as a function of an angular position and an angular speed applied to the motor, via a repetitive learning process using the input reference angular speed, the present angular position of the motor, and one of the speed error from said speed measuring means and the current command output from said speed controller, for removing a high frequency noise generated by the repetitive learning process, and for outputting a resultant disturbance correction value;
   speed command compensating means for obtaining a corrected current command by adding a value of the current command output from said speed controller and the disturbance correction value obtained in said learning compensator; and
   a current controller for receiving the corrected current command and outputting a torque command to the motor.

2. The speed control apparatus according to claim 1, wherein said learning compensator comprises a low pass filter for low-pass-filtering one of the speed error and the current command to be used in the repetitive learning process.

3. The speed control apparatus according to claim 2, wherein said low pass filter has a cut-off frequency capable of suppressing the disturbance due to a cogging torque of the motor.

4. The speed control apparatus according to claim 2, wherein said low pass filter is an IIR filter.

5. The speed control apparatus according to claim 2, wherein said learning compensator comprises,
   a gainer for multiplying an output of said low pass filter by a predetermined learning compensation gain value $K_L$ and outputting a result;
   a storage unit for outputting a disturbance correction value as an output corresponding to the present angular position of the motor among disturbance correction values stored therein, and storing a presently input disturbance correction value at a storage position corresponding to the present angular position; and
   an adder for adding the result of said gainer and the disturbance correction value output from said storage unit, and obtaining a disturbance correction value corresponding to the present angular position of the motor to output the obtained disturbance correction value to said storage unit.

6. The speed control apparatus according to claim 5, wherein said predetermined learning compensation gain value $K_L$ has a relationship of $0<K_L<K_P$ when the speed error is used in the repetitive learning process where $K_P$ is a proportional gain of the speed controller, while a relationship of $0<K_L<1$ governs when the current command is used therein.

7. The speed control apparatus according to claim 5, wherein said adder adds the result of said gainer and the disturbance correction value output of said storage unit when the repetitive learning process is performed, and wherein said adding operation is not performed when no repetitive learning process is executed.

8. The speed control apparatus according to claim 7, wherein said repetitive learning process is performed when the motor rotates at a steady state according to the input reference angular speed.

9. The speed control apparatus according to claim 1, wherein said learning compensator comprises,
   a gainer for receiving one of the speed error and the current command as received data to be used in the repetitive learning process, and for multiplying and outputting the received data by a predetermined learning compensation gain value $K_L$ as an output;
   a storage unit for outputting a disturbance correction value as an output corresponding to the present angular position of the motor among disturbance correction values stored therein, and storing a presently input disturbance correction value at a storage position corresponding to the present angular position of the motor; and
   an adder for adding the output of said gainer and the disturbance correction value output from said storage unit, and obtaining a disturbance correction value corresponding to the present angular position of the motor;
   a low pass filter for low-pass-filtering the disturbance correction value obtained by said adder; and
   an further adder for outputting an output of said low pass filter as a disturbance correction value corresponding to the present angular position of the motor, to said storage unit.

10. The speed control apparatus according to claim 9, wherein said low pass filter has a cut-off frequency capable of suppressing the disturbance due to a cogging torque of the motor.

11. The speed control apparatus according to claim 9, wherein said low pass filter is an FIR filter.

12. The speed control apparatus according to claim 9, wherein said predetermined learning compensation gain value $K_L$ has a relationship of $0<K_L<K_P$ when the speed error is used in the repetitive learning process where $K_P$ is a proportional gain of the speed controller, while a relationship of $0<K_L<1$ governs when the current command is used therein.

13. The speed control apparatus according to claim 9, wherein said adder adds the output of said gainer and the disturbance correction value output of said storage unit when the repetitive learning process is performed, while said adder outputs the output of said storage unit to said low pass filter.

14. The speed control apparatus according to claim 13, wherein said repetitive learning process is performed when the motor rotates in a steady state according to the input reference angular speed.

15. A speed control apparatus for a rotary motor, comprising:
   a motor for rotating at a speed based on a torque command, and generating a pulse signal and a frequency signal according to the rotation of the motor;

a storage unit for storing disturbance correction values relevant to one rotation of the motor;

a current controller for outputting the torque command based on an applied current command; and control means for generating a corrected current command corresponding to a present angular position of said motor, by using the pulse signal and the frequency signal of said motor and at least one of the disturbance correction values stored in said storage unit, and supplying the generated corrected current command to said current controller, wherein said control mean is operative to:

(a) obtain the present angular position of the motor and a corresponding current command thereto using the pulse signal and the frequency signal of said motor;

(b) correct an effect of a disturbance expressed as a function of an angular position and an angular speed applied to the motor, via a repetitive learning process using a reference angular speed of said motor, the obtained present angular position and the corresponding current command, generate a disturbance correction value in which a high frequency noise generated in the repetitive learning process is removed, and store the generated disturbance correction value at a storage position corresponding to the present angular position in said storage unit; and (c) obtain a corrected current command applied to said current controller by adding a value of the obtained current command and the generated disturbance correction value.

16. The speed control apparatus according to claim 15, wherein said control means further comprises a low pass filter for low-pass-filtering the current command corresponding to said present angular position.

17. The speed control apparatus according to claim 16, wherein said low pass filter has a cut-off frequency capable of suppressing the disturbance due to a cogging torque of the motor.

18. The speed control apparatus according to claim 16, wherein said control means further comprises:

means for multiplying said low-pass-filtered current command by a predetermined learning compensation gain and outputting a result; and means for adding the disturbance correction value corresponding to the present angular position of the motor among disturbance correction values stored in said storage unit and the result of said means for multiplying, thereby obtaining a new disturbance correction value corresponding to the present angular position of the motor, wherein said means for multiplying and said means for adding are operative repetitively to obtain a plurality of new disturbance correction values until all new disturbance correction values relevant to one rotation of the motor are obtained.

19. The speed control apparatus according to claim 18, wherein said predetermined learning compensation gain is greater than zero and smaller than 1 in magnitude.

20. The speed control apparatus according to claim 15, wherein said control means adopts the at least one of disturbance correction values corresponding to the present angular position among the disturbance correction values stored in said storage unit to obtain a corrected current command if the current command obtained from the pulse signal and frequency signal of said motor is smaller than a predetermined value.

21. The speed control apparatus according to claim 15, wherein said control means obtains a disturbance correction value via a repetitive learning process when the motor rotates in a steady state according to the input reference angular speed.

* * * * *